Figure 1:
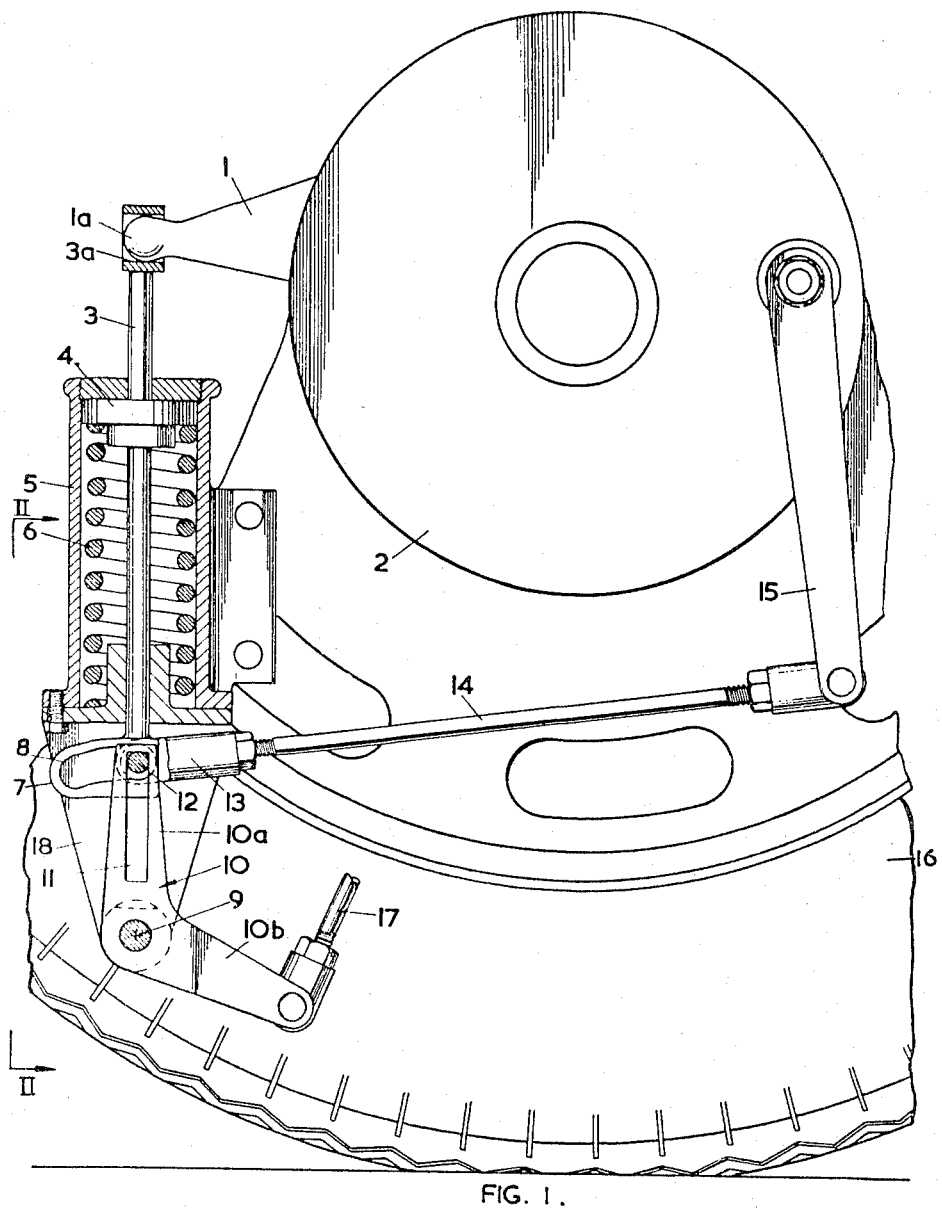

United States Patent
Barnes

[11] 3,847,253
[45] Nov. 12, 1974

[54] VEHICLE BRAKING SYSTEMS
[75] Inventor: Hamilton Nigel Barnes, Sevenoaks, England
[73] Assignee: Minister of Technology in Her Brittanic Majesty's Government of the United Kingdom of Great Britain and Northern Ireland, Millbank, London, S.W.1., England
[22] Filed: May 25, 1973
[21] Appl. No.: 363,831

Related U.S. Application Data
[62] Division of Ser. No. 71,295, Sept. 11, 1970, Pat. No. 3,735,844.

[30] Foreign Application Priority Data
Sept. 12, 1969 Great Britain .................... 45141/69

[52] U.S. Cl............ 188/2 A, 188/181 T, 303/21 CH
[51] Int. Cl............................................. B60t 8/00
[58] Field of Search.... 188/2 A, 180, 181 R, 181 A, 188/181 T; 303/21 CH

[56] References Cited
UNITED STATES PATENTS
3,369,635  2/1968  Davis............................. 188/181 T
3,404,758  10/1968  Mortimer....................... 303/21 CH
3,537,759  10/1970  Du Bois.......................... 303/21 CH Primary Examiner—Trygve M. Blix
Assistant Examiner—Sherman D. Basinger
Attorney, Agent, or Firm—Cameron, Kerkam, Sutton, Stowell & Stowell

[57] ABSTRACT

A vehicle braking system incorporates a shoe carrier or back plate mounted for limited rotation relative to the vehicle chassis and to which a torque is applied, during braking, in opposition to that applied by the braking force in conjunction with the adhesion between the associated road wheel and the ground, which opposing torque rotates the back plate when the road adhesion is reduced by the incidence of slip. The back plate acts as a sensor for a mechanism, which may be hydraulic, pneumatic or mechanical, for reducing the braking force to restore adhesion, which mechanism is preloaded during braking and is allowed to operate on rotation of the back plate by the opposing torque.

15 Claims, 7 Drawing Figures

FIG. 4a.

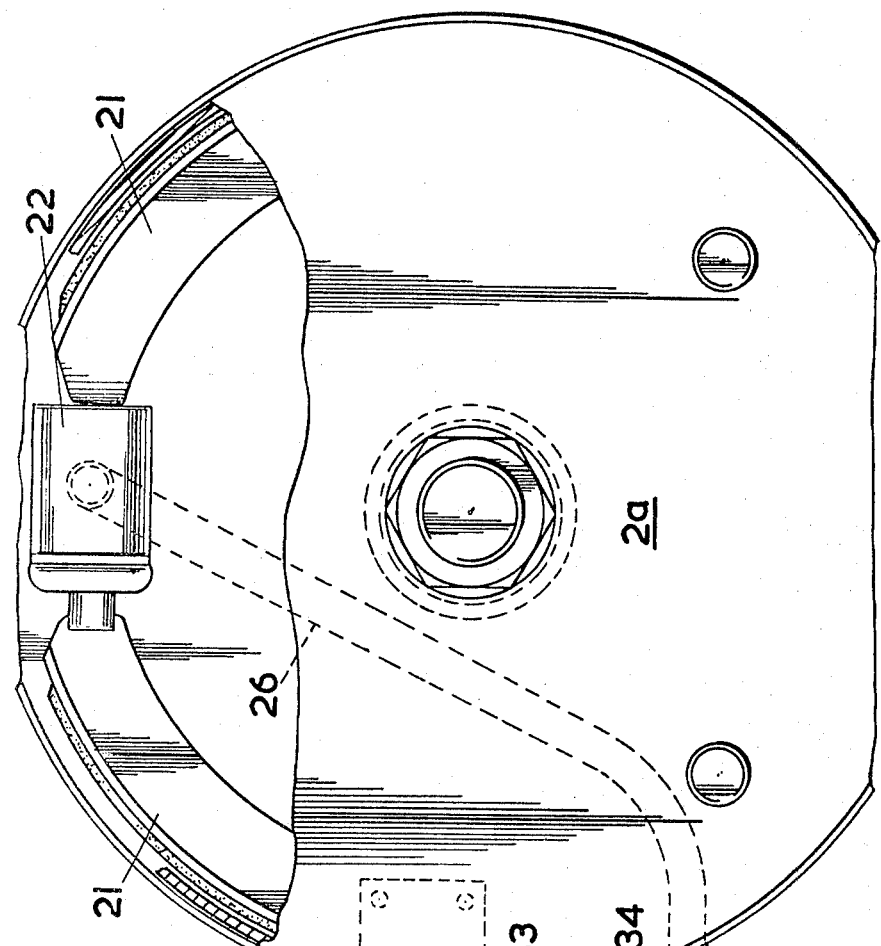
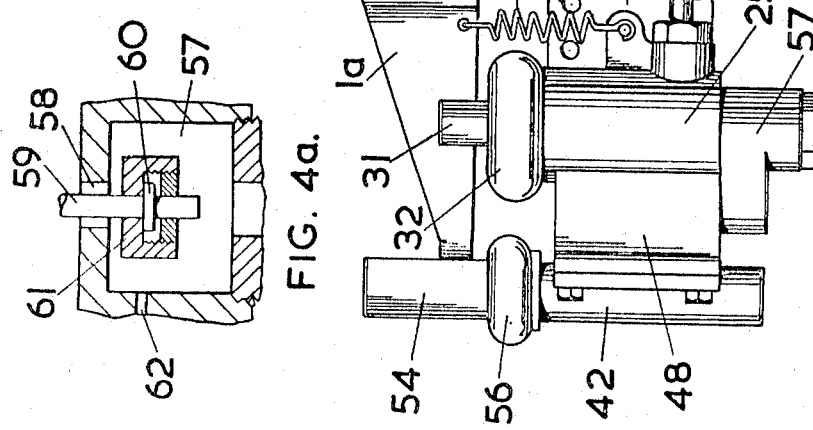
FIG. 4a.
FIG. 3.

VEHICLE BRAKING SYSTEMS

This is a division, of application Ser. No. 71,295, filed Sept. 11, 1970, now U.S. Pat. No. 3,735,844.

The invention relates to vehicle braking systems and is particularly concerned with anti-skid devices for automatically reducing the braking torque at the commencement of a skid when the road wheels of the vehicle lock.

When the brakes are applied on a road vehicle a braking torque is applied to the road wheels, by way of the brake shoe carrier or back plate, in a sense opposite to that produced by the adhesion forces between the tyres and the ground surface. When this braking torque exceeds that applied by the adhesion forces the wheels will lock but will unlock again if the braking torque is removed or sufficiently reduced. The present invention achieves the necessary reduction in braking torque automatically and extremely rapidly when a considerable drop in adhesion forces occurs on the incidence of skidding.

The invention comprises a vehicle braking system comprising a brake shoe carrier or back plate mounted for limited rotation relative to the vehicle chassis; means for apppying to the said back plate, during braking, a torque opposed to that applied thereto by the braking force in conjunction with the adhesion between an associated road wheel and the ground, which opposed torque rotates the back plate when the reaction of the back plate is reduced due to loss of wheel to ground adhesion by the incidence of slip; and means operable on rotation of the back plate, for reducing the braking force to restore adhesion between the road wheel and the ground.

It is to be understood that the term "ground" as used in this specification incorporates any surface upon which the vehicle may be running. The terms "forward rotation" and "rearward rotation" refer to rotation in the same direction as that of the road wheels when the vehicle is moving, without skidding, forward or rearward respectively. "Braking torque" refers to the torque applied to the wheel and hence, in a reverse direction, to the back plate on application of the brakes.

The opposed torque may be applied to the back plate by hydraulic or pneumatic means or by a mechanical arrangement, according to suitability for the particular braking system with which the invention is to be associated. In one arrangement, suitable for use with fluid operated brakes, the opposed torque is applied to the back plate by means of a piston subjected to fluid pressure and which, when the reaction of the back plate is reduced by the incidence of slip between the associated road wheel and the ground, rotates the back plate rearwards, the movement of the piston and the back plate being accompanied by operation of a release valve whereby the fluid pressure actuating the brakes is rapidly reduced. Such an arrangement is suitable for either hydraulic or pneumatic braking systems and, conveniently, the piston is located in an auxiliary cylinder inserted into the fluid braking circuit and interposed hydraulically between the master cylinder and the wheel cylinder. The auxiliary cylinder may be rigidly attached to a fixed part of the axle or its housing adjacent the back plate and the piston may carry a rod which engages a member forming part of or rigidly attached to the back plate. Preferably the fluid pressure on the piston is opposed by a spring sufficiently preloaded to prevent movement of the piston and back plate before initial engagement of the brake shoes.

In an alternative arrangement, suitable for use with a mechanical braking system, the opposed torque is supplied by a spring acting upon the backplate or an attachment thereto, which spring is first stressed by forward rotation of the backplate, with the associated road wheel, when the brakes are applied. This forward rotation of the backplate is arranged to increase the mechanical advantage of the braking system thereby increasing the braking force derived from any given pedal pressure. On rearward rotation of the backplate when road adhesion is reduced, the mechanical advantage of the braking system is reduced, thus reducing the braking force to restore adhesion.

In a preferred form of this arrangement a member actuated by the backplate, is pivoted in one arm of a lever which actuates the brake shoes through a mechanism connected to the same pivot, the pivot being movable along the lever arm so that forward rotation of the backplate moves the pivot toward the fulcrum of the lever to increase the mechanical advantage of the lever and increase the braking power of the system. Rearward rotation of the backplate reverses the effect and reduces the braking power of the system.

Essentially, the application of the brakes is accompanied by a preloading of the means for reducing the braking force as well as by the application of the opposed torque to the back plate. The back plate acts as a sensing device which, as soon as the torque applied thereto by the braking force and road adhesion is reduced by the incidence of slip between the road wheels and the ground, allows the preloading to take effect to reduce the braking torque.

Several forms of the invention will now be more particularly described, by way of example only, with reference to FIGS. 1 to 6 of the accompanying drawings, in which:-

Figure 2:
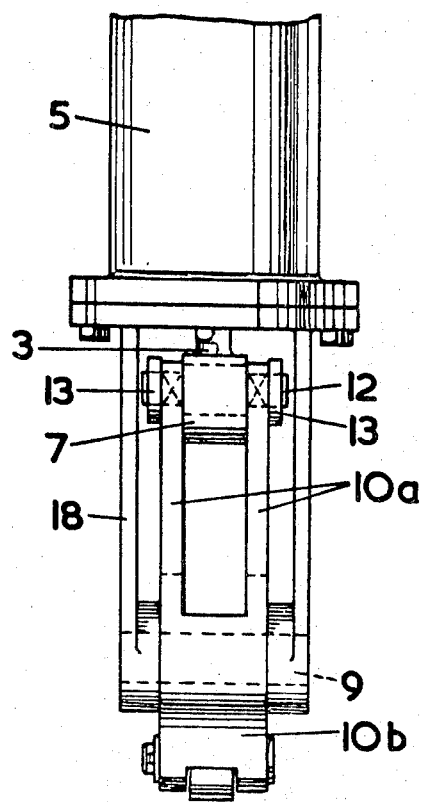

FIG. 1 is a partly schematic side view of a mechanical braking apparatus associated with one wheel of a vehicle, FIG. 2 is a detail viewed in the direction of the arrows II in FIG. 1.

Figure 4:
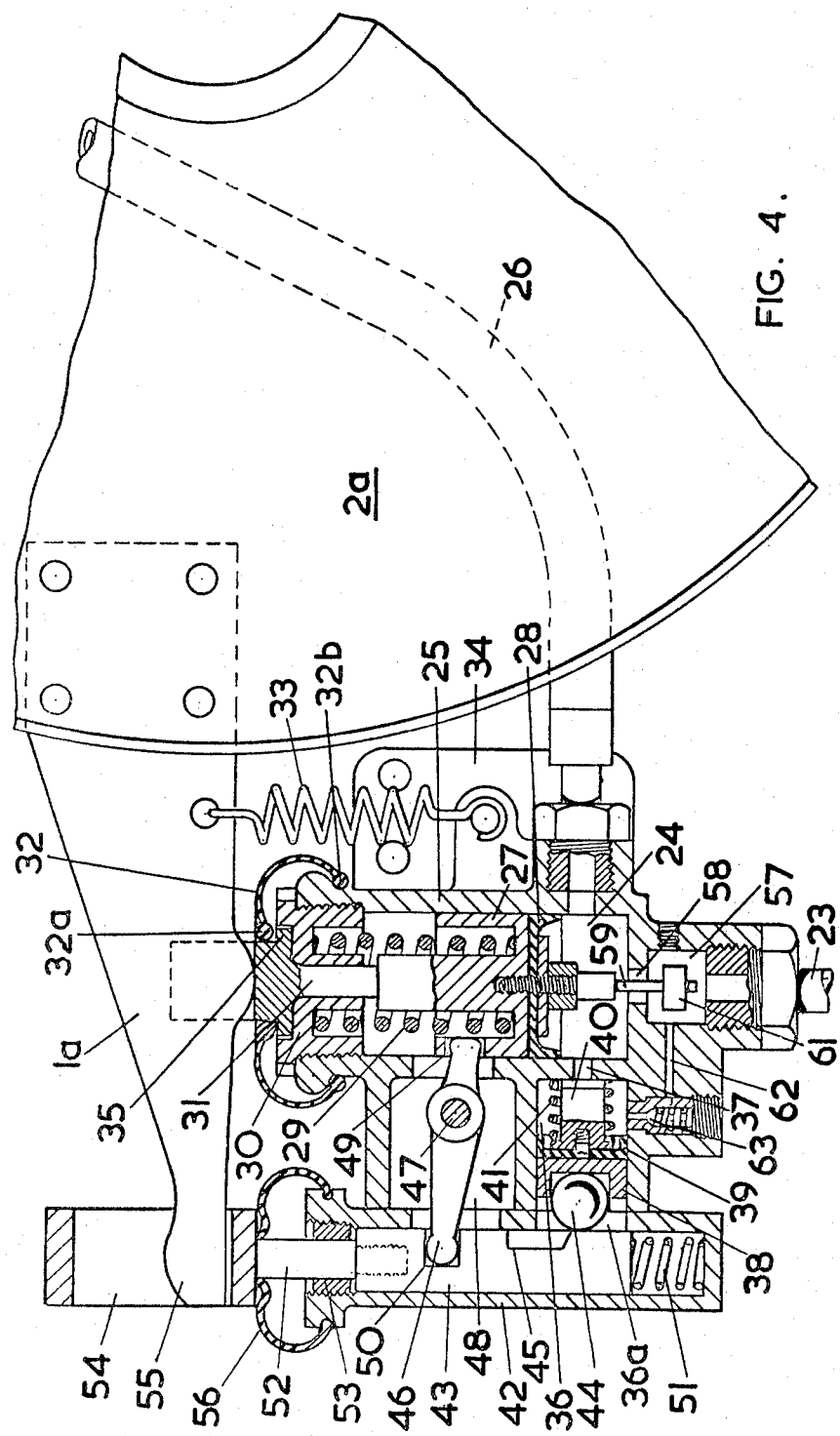
Figure 5:
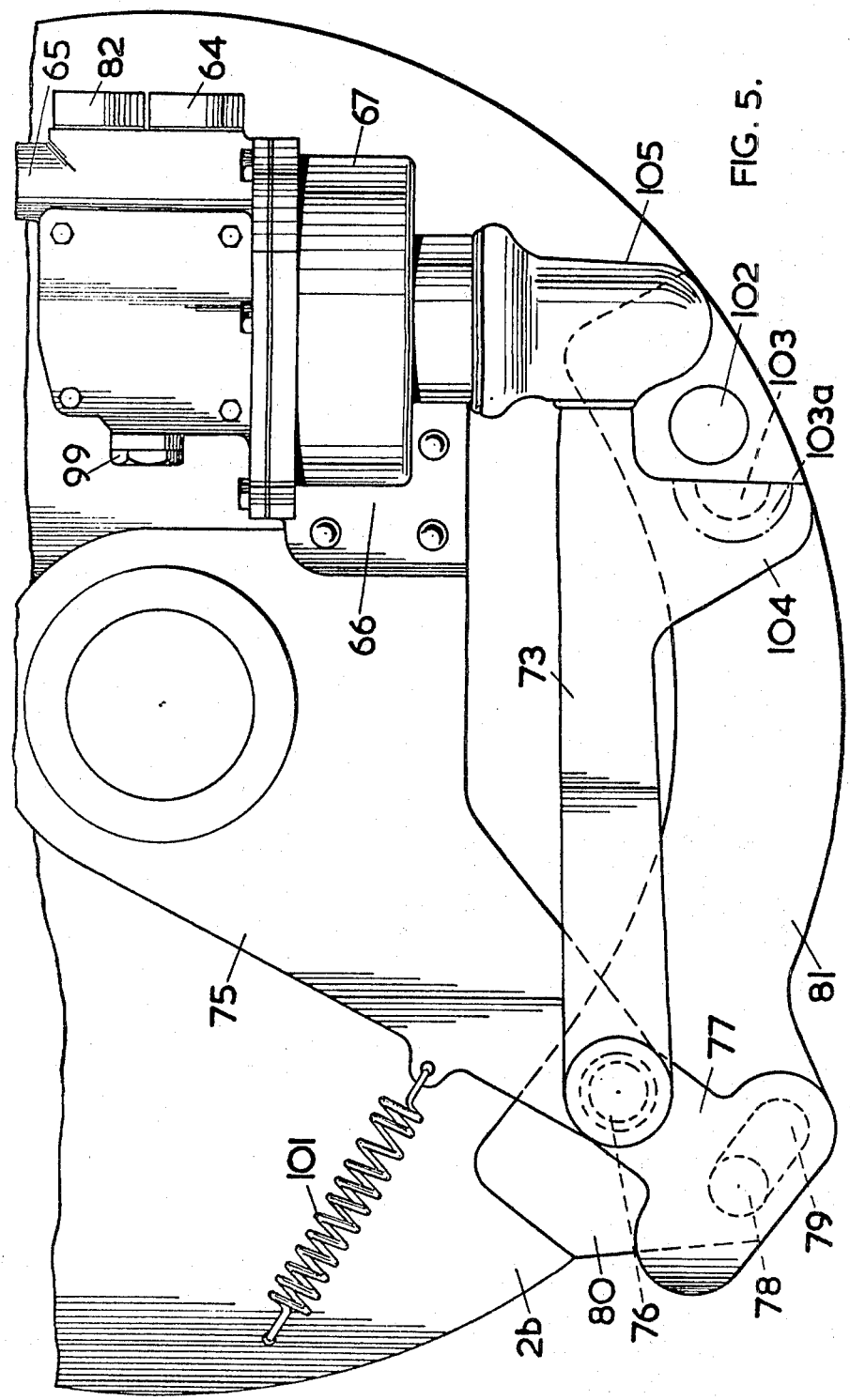
Figure 6:
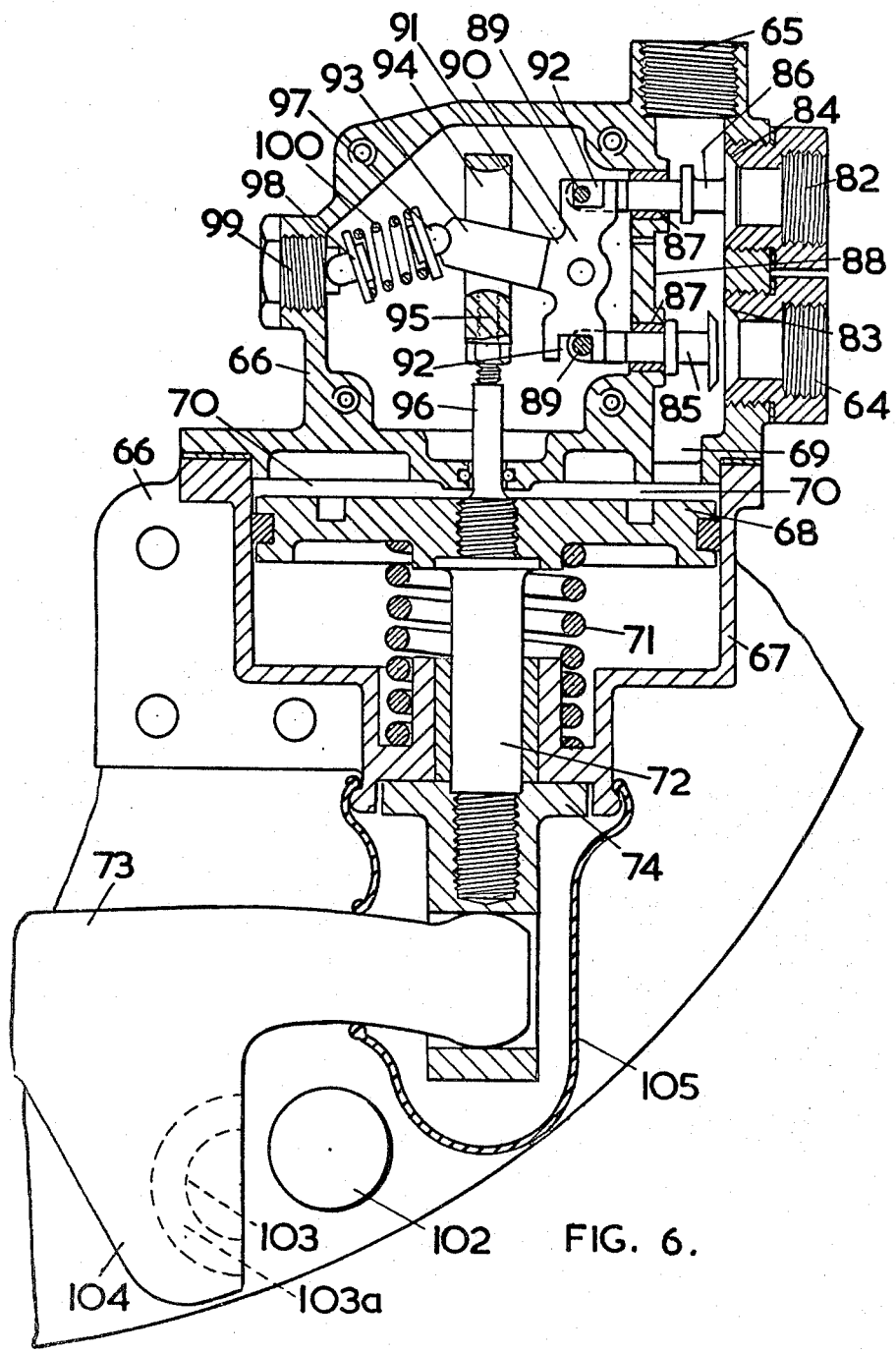

FIG. 3 is a side elevation, partly broken away, of a hydraulic braking apparatus associated with one wheel of a vehicle, FIG. 4 is an enlarged sectional view of a part of the apparatus shown in FIG. 3, FIG. 4a is a detail of part of the apparatus shown in FIG. 4, FIG. 5 is a side elevation, similar to FIG. 3, of a pneumatic braking apparatus, and FIG. 6 is an enlarged sectional view of a part of the apparatus shown in FIG. 5.

In the mechanical arrangement shown in FIGS. 1 and 2 an arm 1 is fixed to and extends outwardly from the back plate 2 or shoe carrier, of the vehicle hub brake assembly, and its outer end 1a, which is preferably of ball or cylindrical form, engages in an aperture 3a formed in one end of a piston rod 3 which is attached to a piston 4 mounted in a cylinder 5. The cylinder 5 is mounted on a part of the vehicle (e.g., the axle casing) which moves vertically with but does not rotate with the associated road wheel 16 of the vehicle. The back plate 2 is mounted for limited rotation relative to the vehicle chassis, forward rotation being opposed by a spring 6 mounted in the cylinder 5. The spring is located between the piston 4 and that end of the cylinder 5 remote from the arm 1 and is arranged to balance the torque applied to the back plate by the application of the brakes.

The piston rod 3 extends right through the cylinder 5 and its other end, remote from the arm 1, carries a bearing member 7 in which is formed an arcuate slot 8, centred about an axis 9, which intersects, perpendicularly, the extension of the axis of piston rod 3 on that side of bearing member 7 remote from cylinder 5. The axis 9 is also the pivotal axis of a bell crank lever 10, the pivot being mounted in a bracket 18 attached to cylinder 5. One arm 10a of the bell crank lever 10 is forked (FIG. 2) and has formed therein, slots 11 whose lengths are radially disposed relative to the axis 9. A pin 12, mounted in slot 8 of the bearing member 7, also extends through the slots 11 in the forked arm 10a of the bell crank lever 10, the two prongs of the fork lying one on either side of the bearing member 7. The pin 12 can slide along slot 8 in the bearing member 7 and also along the slots 11 in the forked arm 10a. Also pivoted on the pin 12 is a yoke 13 mounted on one end of a pull rod 14 whose other end is connected to a brake shoe actuating lever 15 which actuates the brake shoes in known manner. Details of the brake shoes and actuating mechanisms have been omitted for the sake of clarity; they do not form part of the invention. The second arm 10b of the bell crank lever 10 is connected to a linkage 17 which is actuated, in known manner, by a brake pedal (not shown), to apply the brakes.

Before application of the brakes the back plate 2 is maintained at its rearward limit of rotation (clockwise in FIG. 1 of the drawings) by the action of spring 6 acting through piston 4, piston rod 3 and arm 1. This is the position as illustrated in FIG. 1. On application of the brakes, the bell crank lever 10 rotates anti-clockwise carrying pin 12 along slot 8 in the bearing member 7 and actuating the brake shoes by way of pull rod 14 and lever 15. At the same time, the torque applied to the back plate 2 by the braking force in conjunction with the adhesion force between the road wheel 16 and the ground, causes the back plate 2 to rotate forward and, acting by way of arm 1, piston rod 3 and piston 4, to compress the spring 6. The resulting motion of the piston rod 3 causes the pin 12 to slide along slots 11 in the arm 10a of the bell crank lever 10 toward the fulcrum 9 of the lever thereby increasing the mechanical advantage of the system by effectively shortening that arm of the lever. This increases the effective braking power of the system for a given pedal pressure.

When the vehicle wheel 16 begins to slip and ground adhesion is reduced, the forward torque on the back plate 2, due to the adhesion forces, is reduced and the spring 6 causes the back plate 2 to rotate rearwardly and at the same time, piston rod 3 moves the pin 12 along slots 11 away from the fulcrum 9 of the bell crank lever 10, thus reducing the mechanical advantage of lever 10 and causing a very rapid reduction in the braking force to restore adhesion. The reduction in mechanical advantage will produce a "kick-back" of the brake pedal whereafter the brake can be re-applied to repeat the sequence as often as required by the conditions.

It will be clear that many modifications could be made to this arrangement without departing from the scope of the invention. For example, the compression spring 6 could be replaced by a tension spring on the other side of piston 4; the pull rod 14 and linkage 17 could be replaced by members in compression or linkage 17 could be replaced by a hydraulic connection to the brake pedal. Although the spring and cylinder are shown in combination with the linkage between the back plate and the lever 10 they could clearly be separate therefrom and act on the back plate, for example, through a second arm similar to arm 1, the present arm 1 being connected to the pin 12 by a link similar to rod 3 with bearing member 7 but carried in simple guides.

During rearward movement of the vehicle, the back plate remains at its rearward limit of rotation since the braking torque will act in the direction of rearward rotation. Consequently, in these circumstances, normal braking conditions will be applied. Skidding is, of course, unlikely at the very slow speeds normally used for such rearward movement.

This mechanical arrangement is a "proportional" system in which the torque applied to the back plate during braking is balanced by the spring and will produce virtually immediate reaction to any loss of adhesion between road wheel and ground.

The arrangement shown in FIGS. 3, 4 and 4a is intended for use with a hydraulic braking system and, as in the mechanical system, includes an arm 1a fixed to and extending radially outward from the back plate 2a which is mounted for limited rotation relative to the chassis and carries brake shoes 21 actuated, in this case, hydraulically through a wheel cylinder 22. Hydraulic fluid is supplied to wheel cylinder 22 by way of an inlet pipe 23 which communicates with the master cylinder (not shown) and with a pressure chamber 24 in an auxiliary cylinder 25, which pressure chamber communicates with the wheel cylinder by way of a flexible pipe 26. A piston 27, provided with a suitable sealing member 28 can slide within auxiliary cylinder 25 and forms a movable wall to the pressure chamber 24 which can increase in volume by movement of the piston 27 against the action of a spring 29 mounted in the auxiliary cylinder 25 on that side of the piston 27 remote from the compression chamber 24. Spring 29 is retained by an end cap 39 which closes the end of the auxiliary cylinder. A piston rod 31, attached to piston 27, extends through an axial bore in the end cap 30 and engages the arm 1a. Movement of the piston in the direction toward compression chamber 24, and hence forward (anti-clockwise) rotation of the back plate 2a, is limited by a stop flange 35 formed on the piston 27, which flange engages the outer surface of the end cap 30 when the limit of travel is reached. Ingress of dirt is prevented by a flexible sealing cuff 32 which seals upon the piston rod at 32a and upon the auxiliary cylinder at 32b. The arm 1a is urged into engagement with piston rod 31 by means of a tension spring 33 connected to arm 1a and to a mounting bracket 34 by which the auxiliary cylinder 25 is fixed to a part of the axle casing or stub axle (not shown).

Extending radially from the auxiliary cylinder 25 is a smaller, valve cylinder 36 incorporated in a housing 48 and whose interior communicates with the pressure chamber 24 through an orifice 37 coaxial with the valve cylinder 36. Within the valve cylinder 36 is a small piston 38 carrying a sealing member 39 and a stem 40 which extends toward the orifice 37 and is urged away from the orifice by a valve spring 41, located between the piston 38 and the wall in which the orifice 37 is located. A cylindrical guide tube 42 extends across the outer end of valve cylinder 36, its axis being parallel to that of the auxiliary cylinder 25. The outer end of valve cylinder 36 is open and communicates with the interior of the guide tube 42 through an orifice 36a coaxial with valve cylinder 36 and whose diameter is equal to that of the valve cylinder. Located within, and slidable in, the guide tube 42 is a plunger 43 forming a valve detent. Normally the stem 40 is maintained in contact with the inner end wall of the valve cylinder 36, to close orifice 37, by means of a ball 44 interposed between the piston 38 and the plunger 43 but can be released to open the orifice 37 by axial movement of the plunger 43 to bring a notch 45 in the side of the plunger, into register with the ball 44 whereupon the ball 44, piston 38 and stem 40 will be moved outward by the valve spring 41, to open the valve orifice 37. The plunger 43 and the piston 27 in the auxiliary cylinder 25 are interconnected by a lever 46 pivoted at 47 in the housing 48 which extends between the auxiliary cylinder 25 and the guide tube 42. The two ends of the lever 46 extend through the respective walls of cylinder 25 and guide tube 42 to engage in recesses 49 and 50 in the piston 27 and the plunger 43 respectively so that movement of piston 27 to increase the volume of pressure chamber 24 is accompanied by movement, in the opposite direction, of plunger 43 tending to bring notch 45 into register with the ball 44. Such movement of the plunger is opposed by a light restoring spring 51 in compression between the plunger and the end wall of the guide tube. The plunger 43 carries, at its end remote from the spring 51, an extension rod 52 which passes through a bore 53 in the end wall of the guide tube 42 and has at its outer end a slotted member 54 within which is located the outer end 55 of the arm 1a. The end of the guide tube through which the rod 52 passes is sealed by a flexible cuff 56.

When the brakes are applied, under normal conditions the fluid pressure acting on the piston 27 is insufficient to overcome the reaction (forward torque) of the back plate. When slip occurs, however, and the adhesion between road wheel and ground falls, the piston 27 is moved against the reduced reaction of the back plate 2a and rotates the back plate rearward, compressing the spring 29. This movement is accompanied by movement of plunger 43 under the influence of lever 46 and brings the notch 45 into register with the ball 44, whereupon the valve piston 38 and stem 40 move outwardly to open the valve orifice 37. The brake pressure is immediately released by efflux of brake fluid from pressure chamber 24 into the valve cylinder 36. The piston 27 will then return to its normal position under the action of spring 29, assisted by any residual brake pressure which may exist, and the valve orifice 37 will be closed. Since the reduction of brake pressure is very rapid the return of the piston 27 will produce a "kick back" on the brake pedal whereafter the brakes may be re-applied and, if skid conditions still prevail, the sequence of operations will be repeated.

In order to prevent any possibility of continued pressure on the brake pedal causing a sufficiently rapid re-application of the brake pressure to prevent the release valve from operating effectively a small cutoff valve may be incorporated between the inlet pipe 23 and the pressure chamber 24. To this end, a valve chamber 57 is formed on that side of the pressure chamber 24 remote from the piston 27, which valve chamber communicates with the pressure chamber 24 through an orifice 58 coaxial with the auxiliary cylinder 25. A valve stem 59 is attached to piston 27 and extends axially through orifice 58 into the valve chamber 57 where it is provided with a collar 60. Mounted on the stem 59 and surrounding the collar 60, is a boxlike valve closure member 61 (FIG. 4a) which can "float" a short distance axially along the stem 59, the movement being limited by the collar 60. When the piston 27 is moved by fluid pressure to operate the release valve, the stem 59 and the attached closure member 61 travel with it and at the instant when the release valve operates, the closure member 61 is arranged to be within a very short distance of the wall containing orifice 58. When the release valve operates, the sudden drop in fluid pressure in pressure chamber 24 creates a pressure differential on the two faces of closure member 61 which consequently moves axially along the stem 59 to complete the closure of orifice 58. It is not, thereafter, possible to re-apply pressure to the brakes until the piston 27 has at least partially returned to its normal position and thereby reopened the cut-off valve. Clearly the precise time interval between release and re-application of the brake pressure can be determined by the design of this cut off valve. To avoid possible build up of pressure at any time in the valve cylinder 36 a channel 62 incorporating a simple ball valve 63 may be provided, communicating between the valve cylinder 36 and the valve chamber 57.

When the vehicle is reversing, engagement of the brake shoes will rotate the back plate 2a rearward until the end 55 of arm 1a engages the upper portion of the slotted member 54. This locks the plunger 43, piston 27 and release valve piston 38 in their normal positions and thereafter the arrangement operates as a simple hydraulic braking system since the pressure release mechanism is rendered inoperative. On release of the brakes, in this situation, the arm 1a and the back plate 2a will be restored to the position shown in the drawings by the action of tension spring 33.

The arrangement shown in FIGS. 5 and 6, suitable for use with a pneumatic braking system, is identical in principle to the hydraulic arrangement of FIGS. 3 and 4 but differs in the manner of actuation of the pressure release valve which incorporates, in this case, a toggle action mechanism. Furthermore the rotation of the back plate is accomplished by a piston through the action of a lever to provide a mechanical advantage.

Air is supplied to the wheel cylinder (not shown) by way of inlet 64, which communicates with a brake pedal control valve (not shown), and outlet 65 in a housing 66 which also incorporates an auxiliary cylinder 67 in which is mounted a piston 68 and a spring 71 similar to the hydraulic arrangement of FIG. 4. Pneumatic pressure is applied to the piston 68, through orifice 69 and pressure chamber 70, against the action of spring 71. The piston 68 has fixed thereto a piston rod 72 which extends through cylinder 67 to engage the end of one arm 73 of a bell crank lever pivoted at 76. This arrangement is protected against ingress of dirt by a flexible gaiter 105. The other, shorter arm 77 of the lever has mounted thereon a pin 78 which engages in a recess 79 formed in a projection 80 extending radially from the back plate 2b and carried on a member 81 fixed to the back plate. The housing 66 and the pivot 76 of the bell crank lever are rigidly attached to a fixed part 75 of the stub axle. Movement of the piston 68 toward the pressure chamber 70 is limited by a stop flange 74 fixed to the piston rod 72 and arranged to engage the outer face of the end wall of cylinder 67. Except for the interposition of the bell crank lever between the piston rod 72 and the projection 80 on the back plate, this arrangement is essentially the same as the hydraulic arrangement of FIG. 4. The release valve, however, is constructed on a different principle. In addition to inlet 64 which admits air to the housing 66 and the outlets 65 and 69 through which air passes respectively to the wheel cylinder and the pressure chamber 70 an exhaust orifice 82 is provided adjacent the inlet 64. The inlet 64 and exhaust orifice 82 are each provided internally of the housing 66 with a valve seat 83, 84 aligned with a poppet valve 85, 86. The valve stems are carried in guides 87 mounted in a bracket 88 fixed within the housing 66. The valve stems engage, through cross pins 89, notches 92 in the respective ends of the cross member 90 of a T shaped actuator 91 pivoted to the housing at the centre of its cross member 90. The stalk 93 of the T shaped actuator 91 extends through a slot 94 in a member 95 carried on a rod 96 which is fixed to the piston 68. The free end of the stalk is in ball and socket engagement with one end piece 97 of a toggle spring assembly, the other end piece 98 of which is in ball socket engagement with a fixed mounting 99 in the wall of the housing 66. The two end pieces 97 and 98 are separated by a toggle spring 100 in compression therebetween.

On application of the brakes the piston 68 is subjected to fluid pressure and attempts to rotate the back plate 2b rearward through the action of bell crank lever 73, 77, but the torque applied to the back plate by the braking effort is normally large enough to prevent such rotation. On the incidence of slip between road wheels and ground, and consequent reduction of the back plate reaction, the piston 68 moves along cylinder 67 and rotates the back plate rearwardly, compressing spring 71. At the same time slotted member 95 moves with the piston 68 until it engages the stalk 93 of the T shaped actuator and operates the toggle device to close inlet valve 85 and to open exhaust valve 86, whereupon the brakes are released. After release of the brake pressure the piston 68 and the back plate 2b return to their normal positions under the action of spring 71 and a tension spring 101 which is connected to the fixed member 75 and to the back plate 2b. Return of the piston 68 actuates the toggle device in the reverse direction to close the exhaust valve 86 and open inlet 64 whereafter the brakes can be re-applied, and if skid conditions still prevail the sequence will be repeated.

If the vehicle is travelling in reverse, application of the brakes will, initially, rotate the back plate rearward until a stop 102, provided on the member 81 fixed to the back plate, engages in a recess 103, lined with a resilient material 103a, and formed in a projection 104 on the arm 73 of the bell crank lever. The recess 79 in which the pin 78 on the other arm of bell crank lever 73, 77 engages is elongated to permit this initial rotation. After this initial rotation the engagement of stop 102 in recess 103 locks the lever 73, 77 and prevents operation of the release mechanism so that the brakes can be operated in the normal manner as a simple pneumatic braking system. On release of the brakes in this situation, the back plate 2b will be restored to the position shown in the drawings by the action of the tension spring 101.

It will be appreciated that the particular devices described herein are illustrative only and that numerous modifications of them may be made without departing from the scope of the invention. For example, in the hydraulic or pneumatic devices, the auxiliary cylinder and associated release valve mechanism could be combined in a unit incorporating the wheel cylinder and be mounted on the back plate and rotatable therewith. In this case the piston rod would engage a fixed member attached to or forming part of the axle casing.

It is further possible, within the scope of the invention, to interchange parts of the various arrangements described. For example a hydraulically actuated piston could be used to vary the mechanical advantage of a mechanical or part mechanical system, or a spring arrangement could be used to apply the opposed torque in conjunction with a fluid braking system. Various alternative release valve arrangements are possible; the toggle system could easily be incorporated into the hydraulic system so that the two poppet valves operate upon the release valve and inlet orifices. Such an arrangement would eliminate any need for a cut off valve. A redesigned, snap action valve might be incorporated in the pneumatic system. A further possibility is the use of solenoid actuated valves in either of the fluid systems, movement of the piston or back plate being used to operate the necessary switches.

In all cases the system can be designed to suit various vehicles and braking systems by adjustment of one or more of a variety of parameters such, for example, as lever ratios, piston areas and spring strengths. Although the specific examples described herein are related to drum type brakes it will be appreciated that these systems can clearly be applied equally well, with very little, if any, modification, to disc type brakes.

I claim:

1. A fluid actuated vehicle braking system comprising a brake shoe carrier or back plate mounted for limited rotation relative to the vehicle chassis; a balancing cylinder fixed relative to the vehicle axle housing; a piston slidable in the balancing cylinder and operatively connected to the back plate, which piston is subjected to fluid pressure during braking and thereby applies to the back plate a torque opposed to that applied thereto by the braking force in conjunction with the adhesion between an associated road wheel and the ground, which opposed torque rotates the back plate rearward with accompanying movement of the piston in the balancing cylinder when the reaction of the back plate is reduced due to loss of wheel to ground adhesion by the incidence of slip; return spring means acting upon the piston in opposition to the fluid pressure and release valve means operable upon said rearward rotation of the back plate to release fluid from the balancing cylinder and from the fluid circuit of the braking system to reduce the pressure therein and to reduce the braking force to restore adhesion between the road wheel and the ground, the reduction of pressure permitting return movement of the piston by action of the return spring to reverse the operation of the release valve means and allow reapplication of the brakes.

2. A braking system as claimed in claim 1 wherein the balancing cylinder communicates with the fluid circuit of the braking system whereby the piston is subjected, when the brakes are applied, to the pressure of the fluid in the said circuit.

3. A braking system as claimed in claim 1 incorporating a cut-off valve in the fluid circuit actuated by movement of the piston, which cut-off valve closes as the release valve means operates thereby preventing reapplication of the braking force before the release valve means has operated effectively, said cut-off valve being reopened by return movement of the piston.

4. A braking system as claimed in claim 3 wherein the cut-off valve includes a closure member carried by the piston and movable therewith to close the cut-off valve as the release valve means opens.

5. A braking system as claimed in claim 4 wherein the closure member is movable, by a small amount, relative to the piston rod under the influence of the pressure differential due to the pressure drop on one side of said closure member induced by opening of the release valve, to effect the final closure of the cut-off valve.

6. A braking system as claimed in claim 1 wherein the return spring is sufficiently pre-loaded to prevent movement of the piston before the torque is applied to the back plate by the braking force.

7. A braking system as claimed in claim 1 incorporating a member rigidly attached to the back plate and a piston rod carried by the piston, through which rod the fluid thrust on the piston is transmitted to said back plate.

8. A braking system as claimed in claim 1 incorporating a detent member to which the piston is operatively connected, which detent member normally maintains the release valve in the fluid circuit of the braking system closed against the action of a valve spring, whereby movement of the piston on the incidence of slip moves the detent member away from its normal position to permit the release valve to open.

9. A braking system as claimed in claim 1 incorporating a toggle-action release valve to which the piston is operatively connected, whereby movement of the piston on the incidence of slip actuates the toggle to open the release valve.

10. A braking system as claimed in claim 9 including a cut-off valve in the fluid circuit also operated by the toggle, which cut-off valve closes, as the release valve opens, thereby preventing reapplication of the braking force before the release valve has operated effectively.

11. A braking system as claimed in claim 1 wherein the fluid is pneumatic and the release valve exhausts to atmosphere.

12. A braking system as claimed in claim 1 wherein the fluid is hydraulic and a subsidiary chamber is provided to which the release valve means gives access and into which the fluid is released.

13. A braking system as claimed in claim 1 wherein the release valve means comprises a release valve including a closure member, spring urged to the open position and a detent member for holding the valve closed against the spring action, said detent member being movable by movement of the piston to allow the release valve to open under the spring action.

14. A braking system as claimed in claim 1 wherein the release valve means comprises a release valve incorporating a toggle action actuator operatively connected to the piston and operable, on said movement of the piston on the incidence of slip, to open the release valve.

15. A braking system as claimed in claim 14 wherein the cut-off valve is operable by the same toggle-action actuator as the release valve to close as the release valve opens and to open as the release valve closes.

* * * * *